(12) United States Patent
Blackwell et al.

(10) Patent No.: US 10,651,642 B2
(45) Date of Patent: May 12, 2020

(54) TECHNIQUES FOR MONITORING PASSIVE ELEMENTS IN A SYSTEM

(71) Applicant: INTERNATIONAL BUSINESS MACHINES CORPORATION, Armonk, NY (US)

(72) Inventors: Edward L. Blackwell, Rochester, MN (US); James M. Fox, Houston, TX (US); Adrian P. Glover, Katy, TX (US); Brent Yardley, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 15/725,759

(22) Filed: Oct. 5, 2017

(65) Prior Publication Data

US 2019/0109455 A1 Apr. 11, 2019

(51) Int. Cl.
| | | |
|---|---|---|
| *H02H 5/04* | (2006.01) | |
| *H02H 1/00* | (2006.01) | |
| *G06F 1/20* | (2006.01) | |
| *G06F 1/3296* | (2019.01) | |
| *G06F 1/3287* | (2019.01) | |
| *G06F 1/3234* | (2019.01) | |
| *G06F 1/3215* | (2019.01) | |
| *G06F 1/30* | (2006.01) | |

(52) U.S. Cl.
CPC ............... *H02H 5/04* (2013.01); *G06F 1/206* (2013.01); *G06F 1/325* (2013.01); *G06F 1/3215* (2013.01); *G06F 1/3287* (2013.01); *G06F 1/3296* (2013.01); *H02H 1/0092* (2013.01); *G06F 1/30* (2013.01)

(58) Field of Classification Search
CPC ......... H02H 5/04; H02H 1/0092; G06F 1/206
See application file for complete search history.

(56) References Cited

U.S. PATENT DOCUMENTS

| | | | | |
|---|---|---|---|---|
| 5,583,419 A | * | 12/1996 | Haller | ........................ H02J 3/14 |
| | | | | 307/19 |
| 6,504,266 B1 | * | 1/2003 | Ervin | ........................ G06F 1/263 |
| | | | | 307/126 |
| 7,336,046 B2 | | 2/2008 | Yasue | |
| 8,482,310 B2 | | 7/2013 | Kim et al. | |
| 8,699,192 B2 | | 4/2014 | Wang et al. | |
| 9,170,626 B2 | * | 10/2015 | Cline | ........................ G06F 1/206 |

(Continued)

FOREIGN PATENT DOCUMENTS

WO 9837630 A1 8/1998

OTHER PUBLICATIONS

Philbrook et al., "Boundary Scan Tests Ensure Midplane Quality", www.evaluationengineering.com, 2007.

*Primary Examiner* — Scott Bauer
(74) *Attorney, Agent, or Firm* — Michael R. Long; Wenjie Li (57) ABSTRACT

A technique for monitoring a passive element in a system includes determining, by a monitor, power supplied by a power supply coupled to the passive element and power consumed by a load coupled to the passive element. The monitor then determines power dissipated by the passive element based on the power supplied by the power supply and the power consumed by the load. The monitor initiates shut down of the power supply when the power dissipated by the passive element exceeds a threshold.

20 Claims, 6 Drawing Sheets

(56) References Cited

U.S. PATENT DOCUMENTS

2013/0342011 A1\* 12/2013 Robinson ............... G06F 1/263
                                                                    307/12
2015/0067378 A1    3/2015 Kobayashi
2015/0372601 A1  12/2015 Shiu et al.

\* cited by examiner

TECHNIQUES FOR MONITORING PASSIVE ELEMENTS IN A SYSTEM

BACKGROUND OF THE INVENTION

The present disclosure is generally directed to passive elements and, more specifically, to techniques for monitoring passive elements in a system.

Conventionally, many systems (including data processing systems and storage systems) have implemented one or more passive midplanes (e.g., in the form of printed circuit boards (PCBs)). In conventional data processing systems the passive midplanes have usually supplied power to one or more system cards (e.g., via one or more mainboards) and one or more ancillary loads (e.g., fans and active PCBs that are not mainboards). In general, a power supply that has supplied power in a conventional data processing system has implemented output voltage and output current monitoring capability. Typically, mainboards and ancillary loads in a conventional data processing system have implemented input voltage and input current monitoring capability. Unfortunately, conventional data processing systems and conventional storage systems have generally not adequately monitored implemented midplanes for potential problems.

BRIEF SUMMARY

A technique for monitoring a passive element in a system includes determining, by a monitor, power supplied by a power supply coupled to the passive element and power consumed by a load coupled to the passive element. The monitor then determines power dissipated by the passive element based on the power supplied by the power supply and the power consumed by the load. The monitor initiates shut down of the power supply when the power dissipated by the passive element exceeds a threshold.

DETAILED DESCRIPTION

As used herein, the term 'passive midplane' refers to an interconnect, such as a printed circuit board (PCB), that includes conductors (e.g., copper traces) and connectors with no passive or active components or an interconnect, such as a PCB, that includes conductors, connectors, and passive components. As used herein, the term 'midplane' refers to an interconnect that provides power from one or more implemented power supplies to one or more subsystems within a data processing system, a storage system, or another system. As used herein, the term 'passive midplane' refers to an interconnect that does not itself implement over-current protection. While the discussion herein focuses on a 'passive midplane', it should be appreciated that the techniques disclosed herein are broadly applicable to any 'passive element' in a system that has been bench tested to determine power consumption of the 'passive element' during normal conditions.

According to various aspects of the present disclosure, data collected from power supplies and subsystems within a data processing system, storage system, or other system are utilized to detect resistivity changes in a passive midplane. Based on the collected data, preventative action may be taken when an estimated wattage dissipated by a passive midplane exceeds a predetermined limit. For example, the predetermined limit may be established during development testing to prevent catastrophic failure of a passive midplane and/or system that leads to a smoke and/or fire incident. In general, the disclosed techniques are applicable to both direct current (DC) and alternating current (AC) topologies.

In one or more embodiments, a monitor (e.g., at least one service processor) is configured to track output voltage and output current of implemented power supplies and input voltage and input current of implemented mainboards and ancillary loads of a system. In at least one embodiment, a monitor receives signals (e.g., via a sideband communication bus, such as I2C) that are indicative of respective output voltages and output currents supplied by implemented power supplies, as well as respective input voltages and input currents at respective subsystems. The monitor is configured to determine a wattage dissipated in each branch of a midplane based on the respective output voltages and output currents supplied by the implemented power supplies and the respective input voltages and input currents at the respective subsystems. In one or more embodiments, one or more temperature sensors may be implemented to gather temperature data that may be used to scale the dissipated power for a passive midplane based on the thermal resistivity of copper. Scaling the dissipated power for a passive midplane accounts for the increase in resistance associated with a thermal increase.

Figure 1:
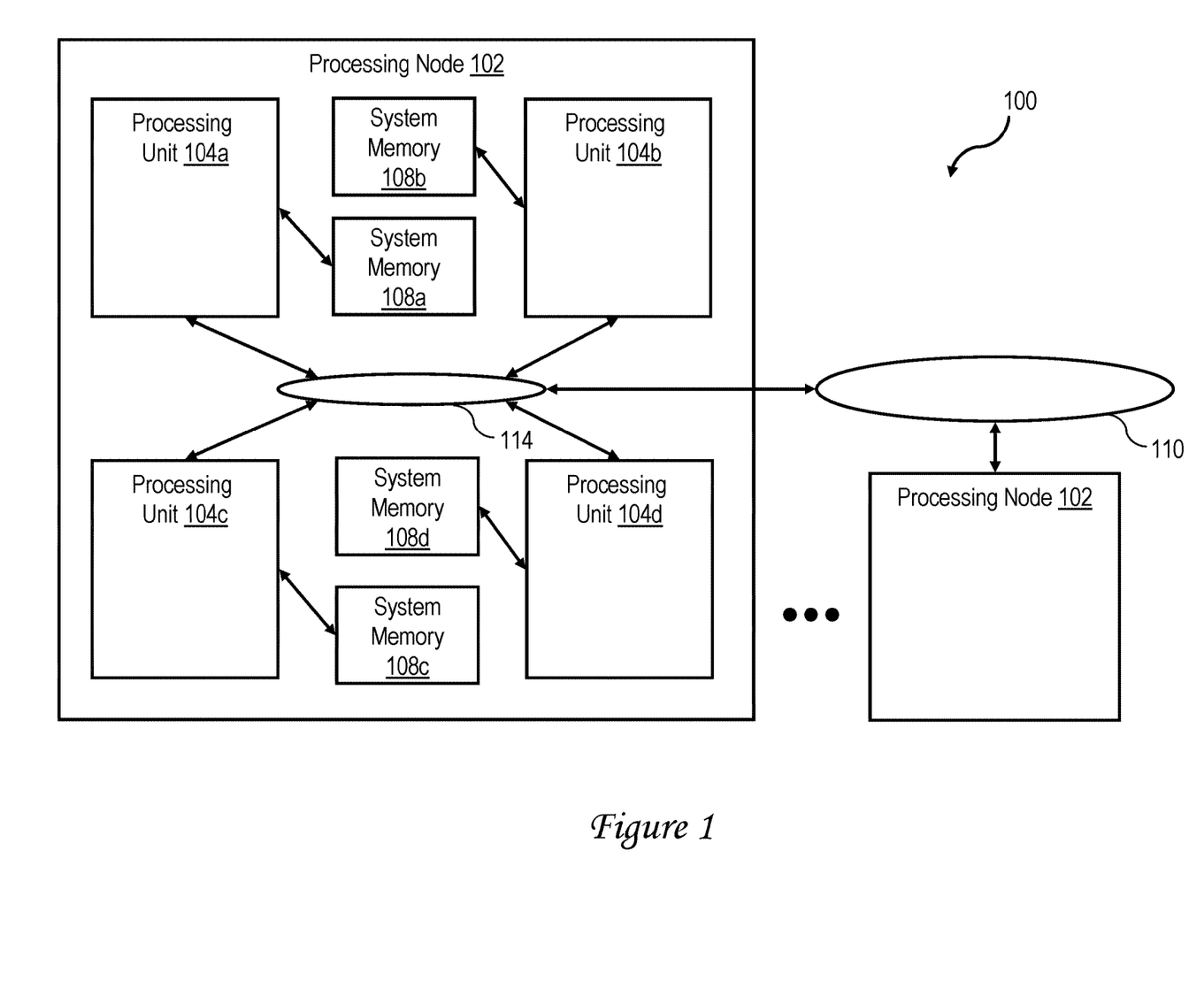
FIG. 1 is a high-level block diagram of an exemplary data processing system in accordance with one embodiment of the present disclosure.

With reference now to the figures, wherein like reference numerals refer to like and corresponding parts throughout, and in particular with reference to FIG. 1, there is illustrated a high level block diagram depicting an exemplary data processing system 100 that implements one or more passive midplanes that are monitored in accordance with one or more embodiments of the present disclosure. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data, and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each which may be realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

Processing units 104 each include a memory controller (not shown) coupled to local interconnect 114 to provide an interface to a respective system memory 108. Data and instructions residing in system memories 108 can generally be accessed, cached, and modified by a processor core in any processing unit 104 of any processing node 102 within data processing system 100. System memories 108 thus form the lowest level of memory storage in the distributed shared memory system of data processing system 100. In alternative embodiments, one or more memory controllers (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
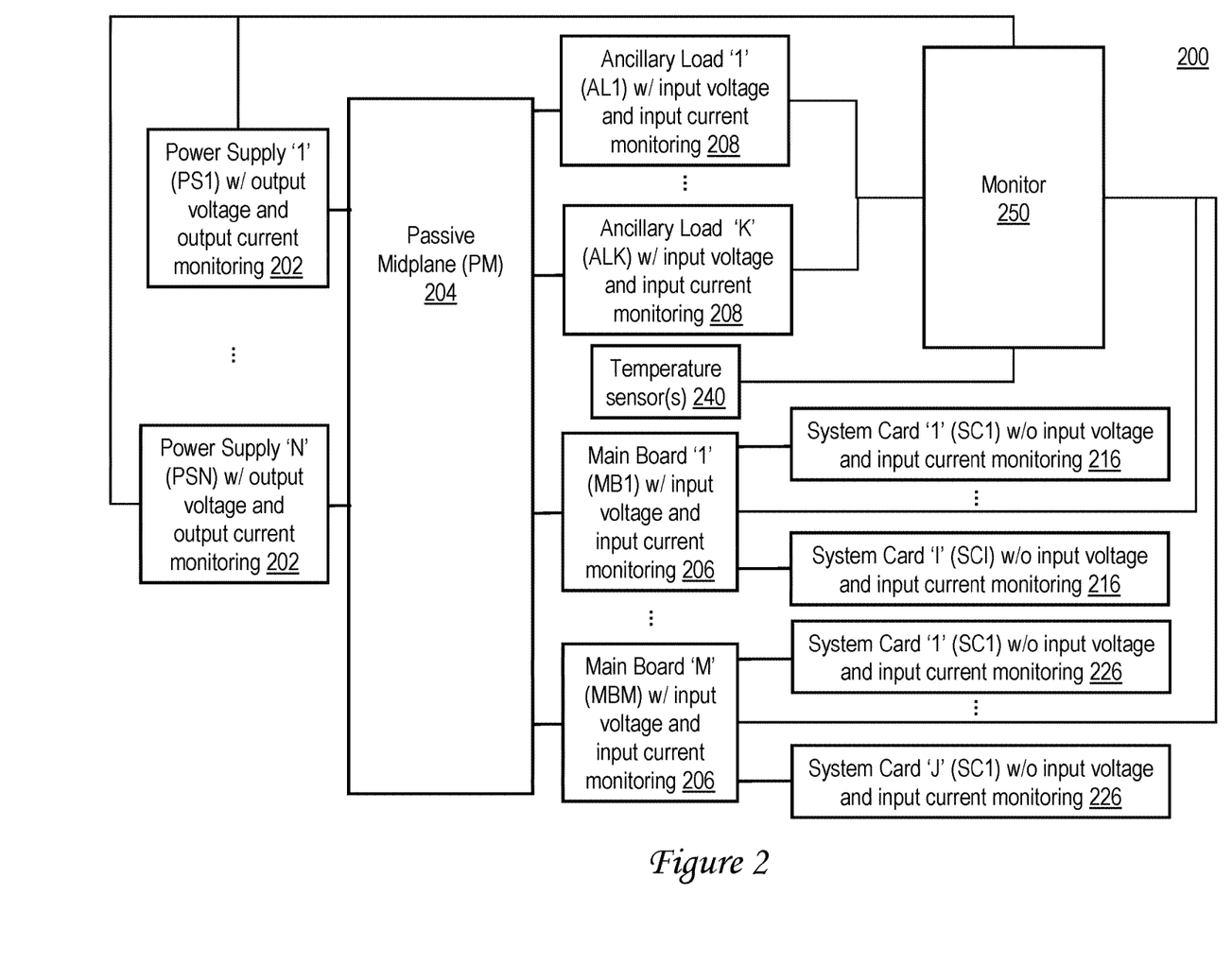
FIG. 2 is a block diagram of an exemplary system that includes a passive midplane that is monitored in accordance with one embodiment of the present disclosure.

Referring now to FIG. 2, an exemplary system 200 (that may take the form of a data processing system, storage system, or other system) is illustrated that includes a passive midplane 204 that is monitored in accordance with the present disclosure. Passive midplane 204 includes one or more branches (not separately shown in FIG. 2) that interconnect power supplies 202 to one or more main boards 206 that each host one or more system cards 216 (e.g., each having one or more processing units 104) and one or more ancillary loads 208. In various embodiments, power supplies 202 implement output voltage and output current monitoring. In at least one embodiment, main boards 206 and ancillary loads 208 implement input voltage and input current monitoring capability, while system cards 216 do not implement input voltage and input current monitoring capability.

Monitor 250 (e.g., at least one service processor) receives signals (e.g., on an I2C bus) from power supplies 202 that are indicative of the output voltage and output current supplied by power supplies 202. Similarly, monitor 250 receives signals (e.g., on an I2C bus) from main boards 206 and ancillary loads 208 that are indicative of the input voltage and input current provided to main boards 206 and ancillary loads 208. Based on knowledge of which power supplies 202, main boards 206, and ancillary loads 208 are coupled to each branch of passive midplane 204, monitor 250 is configured to determine the power dissipated by each branch of passive midplane 204.

According to various embodiments, monitor 250 is configured to determine the power dissipated by each branch of passive midplane 204 based on the output voltage and output current supplied by power supplies 202 and the input voltage and input current provided to main boards 206 and ancillary loads 208. In one or more embodiments, in the event that monitor 250 detects that a branch of passive midplane 204 is experiencing an overload condition that may result in a smoke or fire incident, monitor 250 is configured to send a shut-down signal to an associated power supply (or supplies) 202 that is supplying power to the overloaded branch of passive midplane 204 that causes the associated power supply (or supplies) 202 to discontinue supplying power. In another embodiment, monitor 250 is configured to send a shut-down signal to all power supplies 202 of system 200 when a branch of passive midplane 204 is experiencing an overload condition that may result in a smoke or fire incident.

In one or more embodiments, system 200 also implements one or more temperature sensors 240 that are positioned to monitor a temperature at various locations. For example, a temperature sensor 240 may be located to monitor a temperature of passive midplane 204. In this case, monitor 250 may be configured to receive a signal (e.g., on an I2C bus) from temperature sensor 240 that is indicative of a temperature of passive midplane 204. Monitor 250 may then take into consideration the resistivity of copper at temperature when determining whether passive midplane 204 is in danger of a smoke or fire incident and act accordingly.

Figure 3:
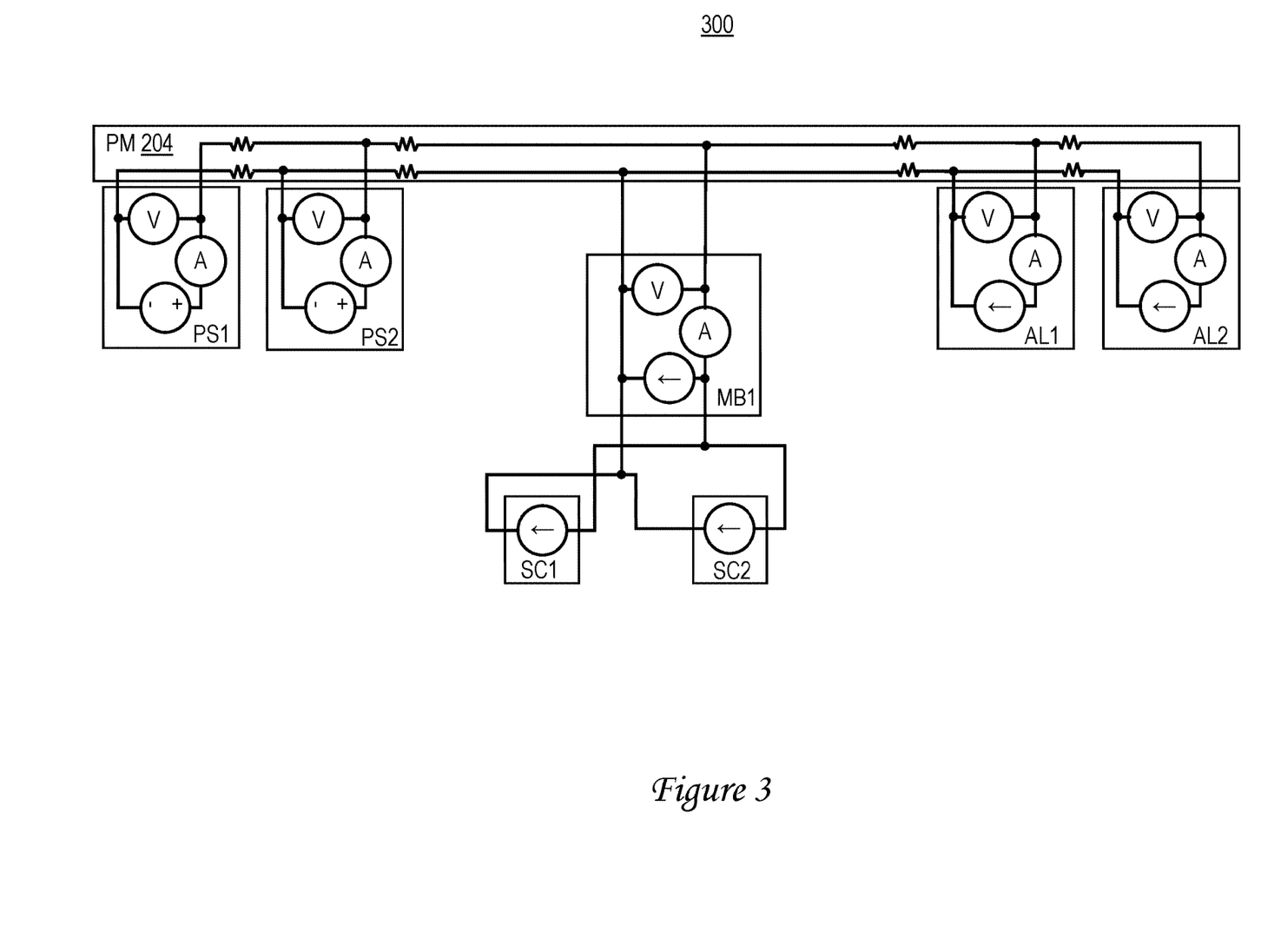
FIG. 3 is a diagram of an exemplary passive midplane design.

With reference now to FIG. 3, an exemplary passive midplane design 300 is illustrated in which multiple power supplies (PS1 and PS2) are coupled to one end of a branch of passive midplane 204. As is shown, multiple ancillary loads (AL1 and AL2) are coupled to an opposite end of the branch of passive midplane 204, with a mainboard (MB1), having two system cards (SC1 and SC2), being coupled to the branch of passive midplane 204 between power supplies (PS1 and PS2) and ancillary loads (AL1 and AL2). It should be appreciated that the number of power supplies, mainboards, ancillary loads, and system cards may be more or less than the number shown in FIG. 3. It should also be appreciated that both power feed and power return lines have inherent resistances that may be determined for nominal loads during development. By implementing temperature sensors at desired locations (e.g., on each branch of passive midplane 204), the sensed temperatures may be utilized to scale the measured resistances based on a temperature coefficient of the midplane power conduction material.

Figure 4:
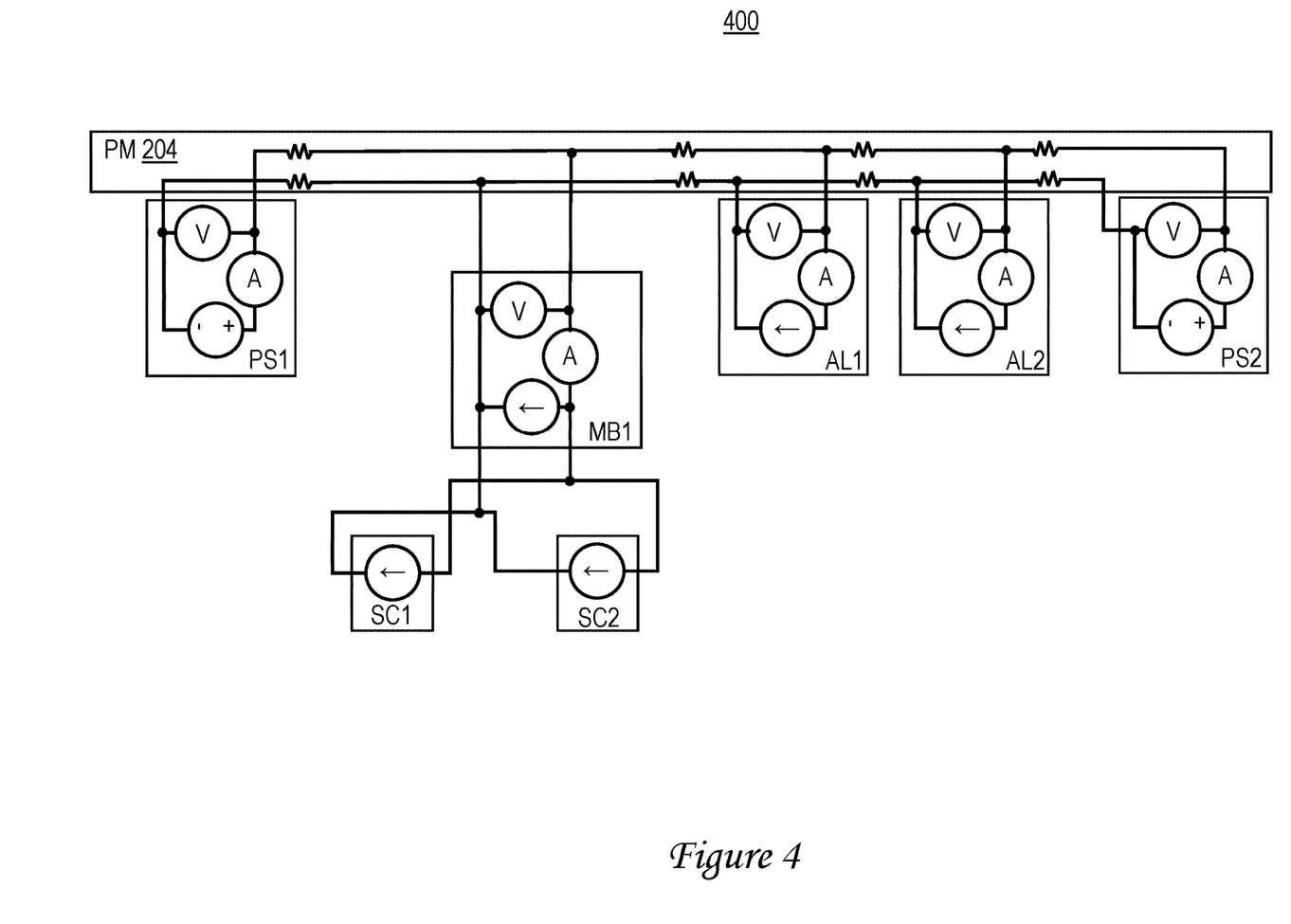
FIG. 4 is a diagram of another exemplary passive midplane design.

With reference now to FIG. 4, another exemplary passive midplane design 400 is illustrated in which multiple power supplies (PS1 and PS2) are coupled at opposite ends of a branch of passive midplane 204. As is shown, multiple ancillary loads (AL1 and AL2) are coupled to the branch of passive midplane 204 adjacent power supply PS2, with a mainboard (MB1), having two associated system cards (SC1 and SC2), being coupled to the branch of passive midplane 204 between power supply PS1 and ancillary load AL1. It should be appreciated that the number of power supplies, mainboards, ancillary loads, and system cards may be more or less than the number shown in FIG. 4.

Figure 5:
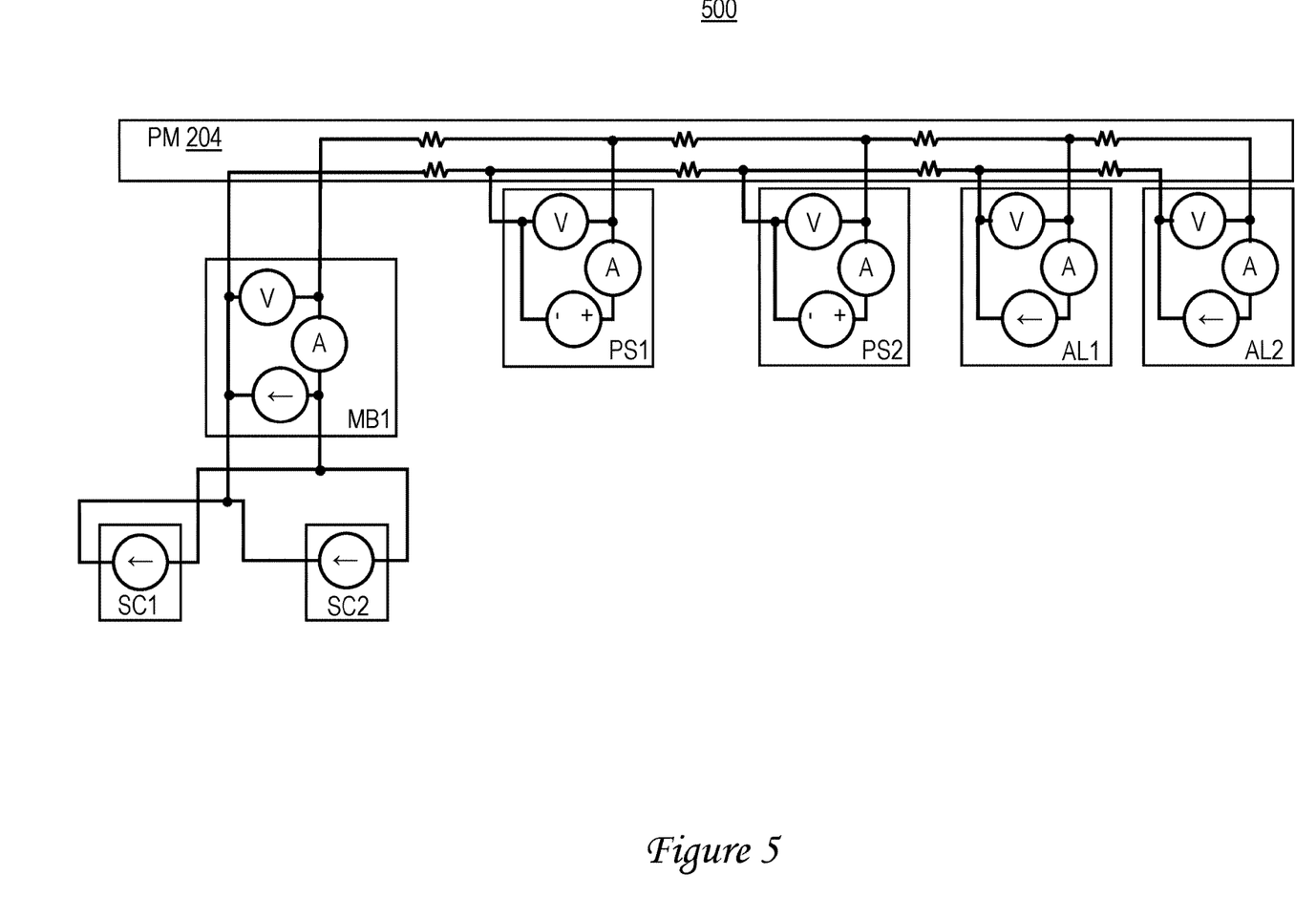
FIG. 5 is a diagram of yet another exemplary passive midplane design.

With reference now to FIG. 5, yet another exemplary passive midplane design 500 is illustrated in which a mainboard (MB1), with two associated system cards (SC1 and SC2), is coupled to one end of a branch of passive midplane 204 and multiple ancillary loads (AL1 and AL2) are coupled to an opposite end of the branch of passive midplane 204. As is shown, power supplies (PS1 and PS2) are coupled to the branch of passive midplane 204 between the mainboard MB1 and the ancillary loads AL1 and AL2. As before, the number of power supplies, mainboards, ancillary loads, and system cards may be more or less than the number shown in FIG. 5. It should also be appreciated that the disclosed techniques are applicable to systems with midplane designs different than those depicted in FIGS. 3-5.

Figure 6:
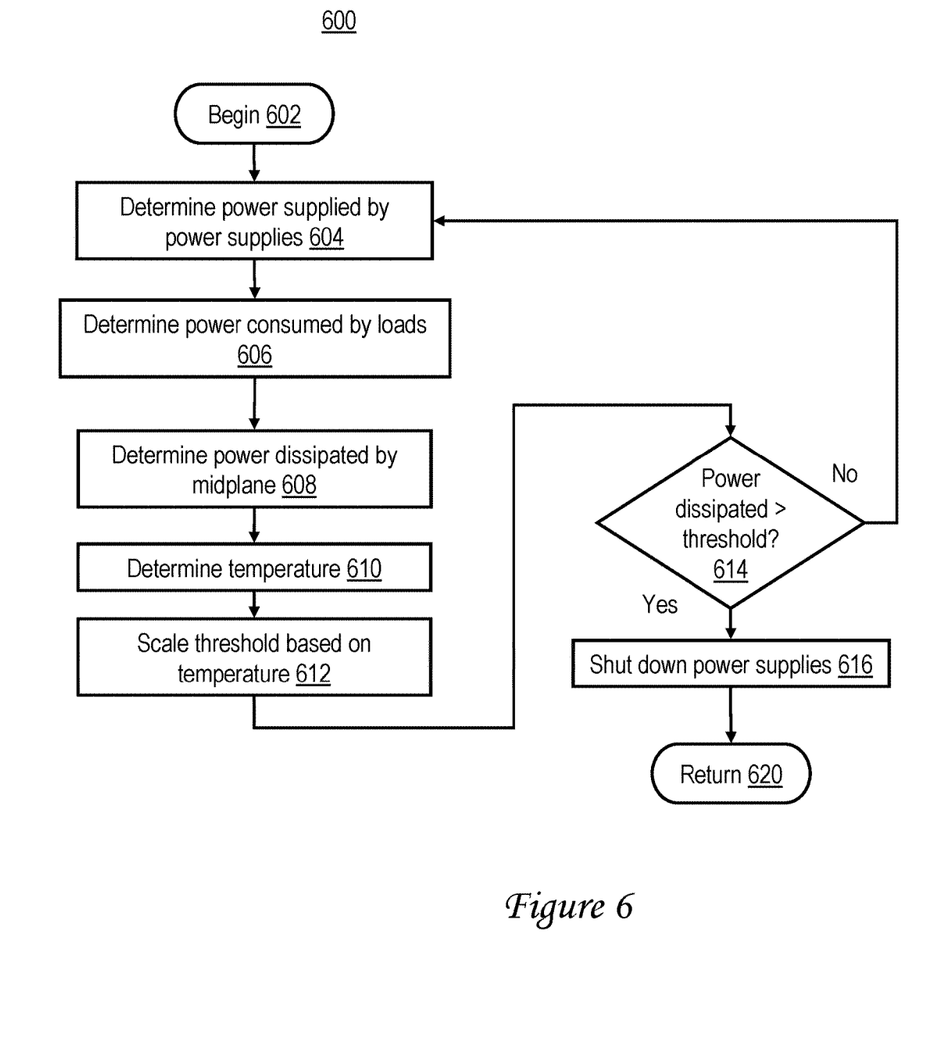
FIG. 6 is a flowchart of an exemplary process for monitoring a passive midplane according to the present disclosure.

With reference to FIG. 6 an exemplary process 600 is illustrated that may be implemented by monitor 250. Monitor 250 may, for example, correspond to a service processor (e.g., implemented by a processing unit 104). Process 600 is, for example, initiated when system 200 is powered-up, in block 602. Next, in block 604, monitor 250 determines power supplied by power supplies 202. Each should be appreciated that passive midplane 204 may implement multiple branches and that monitor 250 may separately determine power provided to each branch of midplane 204. Next, monitor 250 determines the power consumed by loads (e.g., system cards 216 coupled to midplane 204 by main boards 206 and ancillary loads 208) coupled to midplane 204. When midplane 204 implements multiple branches monitor 250 determines power consumed by loads coupled to each branch of midplane 204, as well as power supplied to each branch.

Next, in block 608, monitor 250 determines the power dissipated by each branch of midplane 204 (by subtracting the power consumed for all loads coupled to a branch from the power supplied by all power supplies coupled to the branch). Then, in block 610, monitor 250 determines the temperature sensed by temperature sensors 240 at various locations in system 200. For example, a temperature sensor 240 may be located to measure a temperature at each branch of midplane 204. Then, in block 612, monitor 250 scales a threshold based on the temperature. In various embodiments, the threshold is developed during bench testing and is scaled based on the resistivity of copper. Next, in decision block 614, monitor 250 determines whether the power dissipated by midplane 204 has exceed the threshold. In response to the power dissipated by midplane 204 not exceeding the threshold in block 614 control returns to block 604. In response to the power dissipated by midplane 204 exceeding the threshold control transfers from block 614 to block 616. In block 616, monitor 250 initiates shut-down of power supplies 202 that are supplying power to midplane 204 to prevent a fire incident in system 200 (it should be appreciated that midplane 204 may be damaged, rendered non-functional, and require replacement). Following block 616 control transfers to block 620, where process 600 terminates.

Accordingly, techniques have been disclosed herein that may be implemented to monitor passive midplanes in various systems (e.g., data processing systems, storage systems, and other systems) to protect the systems from fire incidents.

In the flow charts above, the methods depicted in the figures may be embodied in a computer-readable medium as one or more design files. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system."

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of monitoring a passive element in a system, comprising:

determining, by a monitor, power supplied by a power supply coupled to the passive element;

determining, by the monitor, power consumed by a load coupled to the passive element;

determining, by the monitor, power dissipated by the passive element based on the power supplied by the power supply and the power consumed by the load; and initiating, by the monitor, shut down of the power supply when the power dissipated by the passive element exceeds a threshold.

2. The method of claim 1, wherein the system is a data processing system.

3. The method of claim 1, wherein the system is a storage system.

4. The method of claim 1, wherein the passive element is a passive midplane.

5. The method of claim 1, wherein the threshold is scaled based on a temperature sensed at the passive element.

6. The method of claim 1, wherein the load includes one or more mainboards.

7. The method of claim 1, wherein the load includes one or more mainboards each having one or more associated system cards and one or more ancillary loads.

8. A data processing system, comprising:
   a midplane;
   one or more power supplies coupled to the midplane;
   one or more loads coupled to the midplane; and
   a monitor in communication with the power supplies and the loads, wherein the monitor is configured to:
     determine power supplied by the power supplies;
     determine power consumed by the loads;
     determine power dissipated by the midplane based on the power supplied by the power supplies and the power consumed by the loads; and
     initiate shut down of the power supplies when the power dissipated by the midplane exceeds a threshold.

9. The data processing system of claim 8, wherein the system is a data processing system.

10. The data processing system of claim 8, wherein the system is a storage system.

11. The data processing system of claim 8, wherein the midplane is a passive midplane.

12. The data processing system of claim 8, wherein the threshold is scaled based on a temperature sensed at the midplane.

13. The data processing system of claim 8, wherein the load includes one or more mainboards.

14. The data processing system of claim 8, wherein the load includes one or more mainboards each having one or more associated system cards and one or more ancillary loads.

15. A system, comprising:
   a midplane;
   one or more power supplies coupled to the midplane;
   one or more loads coupled to the midplane; and
   a monitor in communication with the power supplies and the loads, wherein the monitor is configured to:
     determine power supplied by the power supplies;
     determine power consumed by the loads;
     determine power dissipated by the midplane based on the power supplied by the power supplies and the power consumed by the loads; and
     initiate shut down of the power supplies when the power dissipated by the midplane exceeds a threshold.

16. The system of claim 15, wherein the system is a data processing system or a storage system.

17. The system of claim 15, wherein the midplane is a passive midplane.

18. The system of claim 15, wherein the threshold is scaled based on a temperature sensed at the midplane.

19. The system of claim 15, wherein the load includes one or more mainboards.

20. The system of claim 15, wherein the load includes one or more mainboards each having one or more associated system cards and one or more ancillary loads.

* * * * *